United States Patent

Welch

[11] Patent Number: 5,377,410
[45] Date of Patent: Jan. 3, 1995

[54] CUTTER FOR STRAND-ENCIRCLING SHEATHS

[76] Inventor: Wade Welch, 1935 Lukens Ave., Willow Grove, Pa. 19090

[21] Appl. No.: 142,233

[22] Filed: Oct. 25, 1993

[51] Int. Cl.⁶ .............................................. H02G 1/12
[52] U.S. Cl. .................................. 30/90.1; 30/278; 81/9.44
[58] Field of Search .............. 81/9.4, 9.44; 30/90.1, 30/90.6, 90.7, 91.2, 95, 278, 279.2, 320, 321

[56] References Cited

U.S. PATENT DOCUMENTS

| | | | |
|---|---|---|---|
| 3,100,934 | 8/1963 | Jonasson | 30/102 |
| 3,204,495 | 9/1965 | Matthews | 30/90.1 |
| 3,537,350 | 11/1970 | Scott | 83/439 |
| 3,572,189 | 3/1971 | Matthews | 30/90.1 |
| 3,826,001 | 7/1974 | Bilbrey et al. | 30/90.1 |
| 3,971,129 | 7/1976 | Adams | 30/90.1 |
| 4,056,021 | 11/1977 | Lacey | 83/4 |
| 4,059,893 | 11/1977 | Solury | 30/90.1 |
| 4,366,619 | 1/1983 | Bieganski | 30/90.1 |
| 4,449,298 | 5/1984 | Putz | 81/9.4 |
| 4,455,745 | 6/1984 | Toeppen | 30/90.6 |
| 4,628,599 | 12/1986 | Bermier, Jr. et al. | 29/857 |
| 4,799,406 | 1/1989 | Diaz-De-Guerenu | 81/9.4 |
| 4,805,302 | 2/1989 | Steiner | 30/90.1 |
| 4,845,849 | 7/1989 | Aubriot | 30/92 |
| 4,955,137 | 9/1990 | Matthews | 30/90.1 |
| 5,044,078 | 9/1991 | Heaton, Sr. | 30/90.8 |
| 5,074,043 | 12/1991 | Mills | 30/91 |

OTHER PUBLICATIONS

ARNCO "Perma-Guard Cable-In-Duct" brochure, undated.
Ripley Company, Inc. "Cablematic Cable Preparation Tools" brochure, Cat. #33586, Apr. 1991.

Primary Examiner—Richard K. Seidel
Assistant Examiner—Hwei-Siu Payer
Attorney, Agent, or Firm—Synnestvedt & Lechner

[57] ABSTRACT

A manual tool that includes a housing having a passage for receiving a cable and having a blade assembly contained within the housing. The blade assembly includes a blade setting device and a blade returning device. The blade setting device pushes the blade out of the housing into a position which provides for cutting a cable sheath a predetermined thickness. The blade returning device acts to yieldingly push the blade into the recesses position within the housing. The blade setting device acts in conjunction with the blade returning device to adjust the depth of penetration of the blade.

9 Claims, 6 Drawing Sheets

CUTTER FOR STRAND-ENCIRCLING SHEATHS

FIELD OF THE INVENTION

The present invention relates to a tool for cutting strand-encircling sheaths and, more particularly, to a tool for cutting sheaths or conduits encircling electrical conductors, such as the sheath or conduit of an electrical cable.

BACKGROUND OF THE INVENTION

Initial installation and subsequent repair of electrical cables require the splicing together of cables. Cables comprise electrical conductors surrounded by a protective sheath. The sheath and conductors may be encased within a protective conduit. "Sheath" and "conduit" are used herein interchangeably.

The severed ends of cables are prepared for splicing by careful removal of portions of the cable sheath. It is important to cut the sheath to the correct depth. If too deep a cut is made, the insulation or the conductors beneath the sheath may be damaged.

Installed cables are usually concealed in cramped spaces such as trenches, lock boxes, pedestals and the inside of walls or ceilings. In order to gain access to cables in such spaces, a large area around the cables must be cleared. Considerable excavation or destruction around the cutting area can compromise the structural integrity of the surrounding area and increase the cost of repairs.

Various tools have been provided for cutting strand-encircling sheaths. Conventionally, a hand-held knife can be employed. In use, a technician holds a cable in one hand and wields a knife in the other hand. However, a technician's hands are unable to provide a stable support for the cable and do not allow for accurate measurement of the depth of penetration of the knife blade. Due to these disadvantages, damage to the underlying insulation and conductors is likely. In addition, the exposed knife blade is potentially dangerous to the technician.

A type of sheath cutting tool especially intended for the purpose is described in U.S. Pat. No. 5,074,043 to Mills. U.S. Pat. No. 5,074,043 discloses a tool including a tubular housing, a blade assembly and a means for positioning the blade. The blade assembly includes a blade held within a carrier comprising two plates on opposite sides of the blade, each plate having a recess to expose a portion of the blade edge. The blade assembly is held in and against a slot in the housing by a tension spring which surrounds the circumference of the housing. In operation, a cable is positioned within the housing and the tool is manually rotated to circumferentially cut the cable sheath.

The penetration of the blade into the cable sheath is limited to the portion of the blade exposed at the central recess portion of the blade carrier. In addition, since the depth of the blade cannot be adjusted, the tool cannot accommodate cables having different diameters.

Other types of tools include those described in U.S. Pat. No. 4,955,137 to Matthews, U.S. Pat. No. 4,799,406 to Diaz-De-Guerenu-Aguirrebeitia and U.S. Pat. No. 3,826,001 to Bilbrey et al. These patents disclose means for supporting a cable and means for cutting the cable sheath. The cutting means include cutting members secured to threaded shafts. The threaded shafts are rotated to adjust the penetration depth of the cutting member.

Still additional types of tools include those disclosed in U.S. Pat. No. 4,805,302 to Steiner and U.S. Pat. No. 4,366,619 to Bieganski. These tools disclose a housing having an opening for a cable and a sliding frame mounted within the housing. The cutting member is mounted on the sliding frame. The sliding frame, and thus the cutting member, are biased into the cable opening by a spring within the housing. In operation, the cutting member is positioned out of the cable opening and a cable is inserted therein. The cutting member is then positioned in the cable opening, by releasing the sliding frame, and the tool is manually rotated to produce a circumferential cut on the cable sheath.

In U.S. Pat. No. 4,805,302, the depth of penetration of the cutting member is determined by a flange on the sliding frame which acts as a stop. In U.S. Pat. No. 4,366,619, the cutting member is additionally connected to a threaded shaft. Adjustment of the threaded shaft adjusts the depth of penetration of the cutting member.

None of the aforementioned tools are adapted for use on installed cable which does not have a readily accessible free end. Furthermore, the tools discussed above do not disclose a blade assembly including a blade setting means which acts in conjunction with a blade returning means.

OBJECTS AND SUMMARY OF THE INVENTION

It is an object of the invention to provide a tool which accurately cuts a cable sheath without damaging an underlying insulation layer or conductor.

Another object of the invention is to provide a tool with means to adjust the depth of penetration of a cutting means to accommodate cable sheaths of varying thickness.

A further object of the invention is to provide a tool which does not have an exposed blade with the potential to cause injury.

Another object of the invention is to provide a tool having a blade assembly which includes a blade setting means which acts in conjunction with a blade returning means.

A further object of the invention is to provide a tool for use on installed cable which does not have a readily accessible free end.

Still another object of the invention is to provide a tool which is compact and requires a minimum of space around the cable for the cutting operation.

The above and other objects, features and advantages of the present invention will become apparent from the following description and the appended claims taken in conjunction with the accompanying drawings.

These and other objects are preferably accomplished by providing a tool that includes a housing having an opening for a cable and a blade assembly contained within the housing. The blade assembly includes a blade setting means and a blade returning means. The blade setting means pushes the blade out of the housing. The blade returning means pushes the blade into the housing. The blade setting means acts in conjunction with the blade returning means to adjust the depth of penetration of the blade.

The tool is manually operated by gripping the outer circumference of the housing and moving the housing about or along the cable. The compact shape considerably decreases the volume of material to be removed around the cutting site.

According to one aspect of the invention, the housing is an integral unit having the shape of a tube or cylinder.

According to another aspect of the invention, the housing includes two distinct parts which when attached together form the shape of a tube or cylinder. At one end, the two parts are hinged. At the other end, the two parts may be selectively positioned in an open position or in a closed position. In the closed position, the two parts may be locked together. This configuration makes it possible to put the tool astride the cable. Thus, the sheath of installed cable, which does not have a readily accessible free end, can be easily cut.

According to yet another aspect of the invention, the tool may have more than one blade assembly.

DETAILED DESCRIPTION OF THE PREFERRED EMBODIMENT OF THE PRESENT INVENTION

Figure 1:
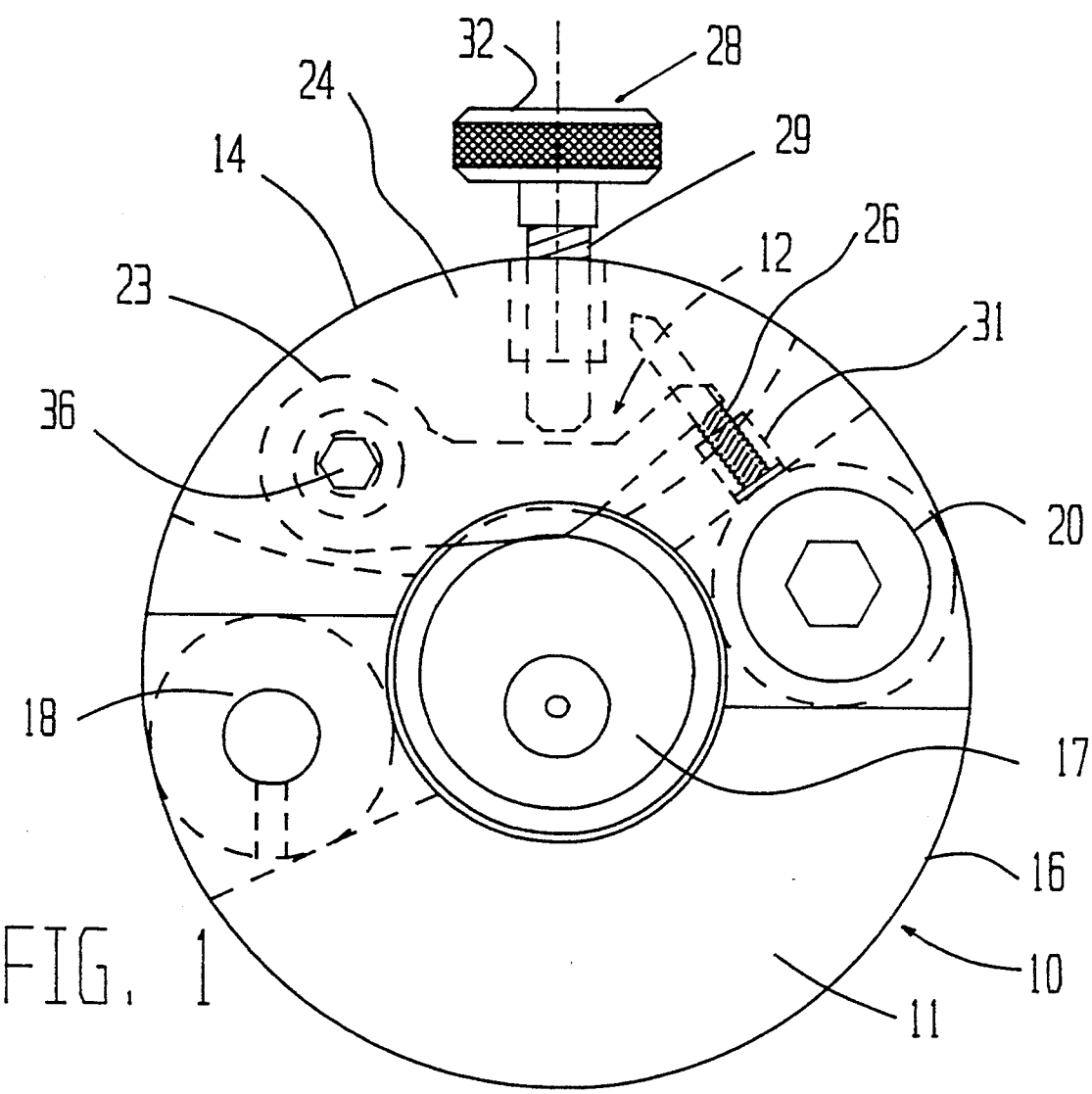
FIG. 1 is a view in plan showing a preferred embodiment of the present invention.
Figure 2:
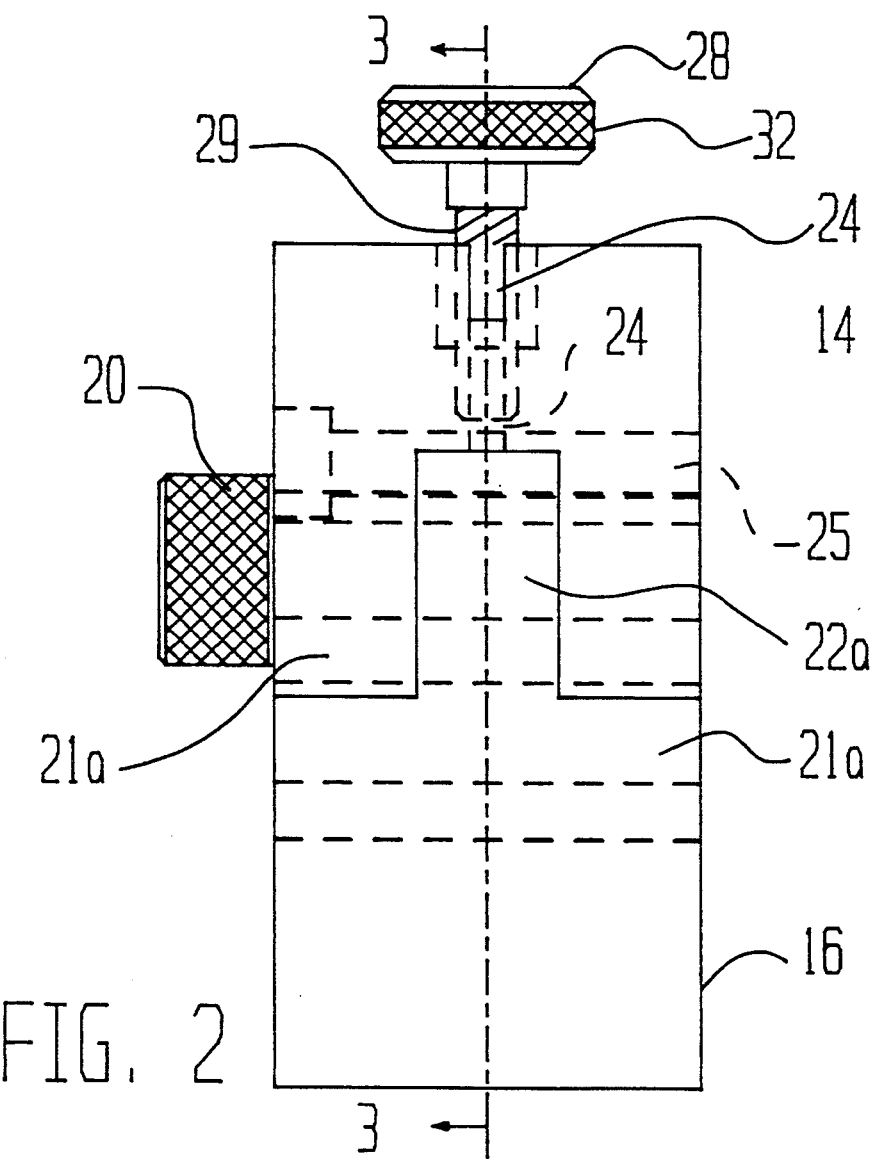
FIG. 2 is a side view of the device shown in FIG. 1.

The present invention will be described with reference to FIGS. 1-6 which illustrate two preferred embodiments of the invention useful for the striping of cable sheaths from a cable of the type installed by cable television companies in locations where accessibility is a problem. In the following description, in reference to the parts illustrated in the drawings, like numerals are utilized to refer to like parts.

Figure 3:
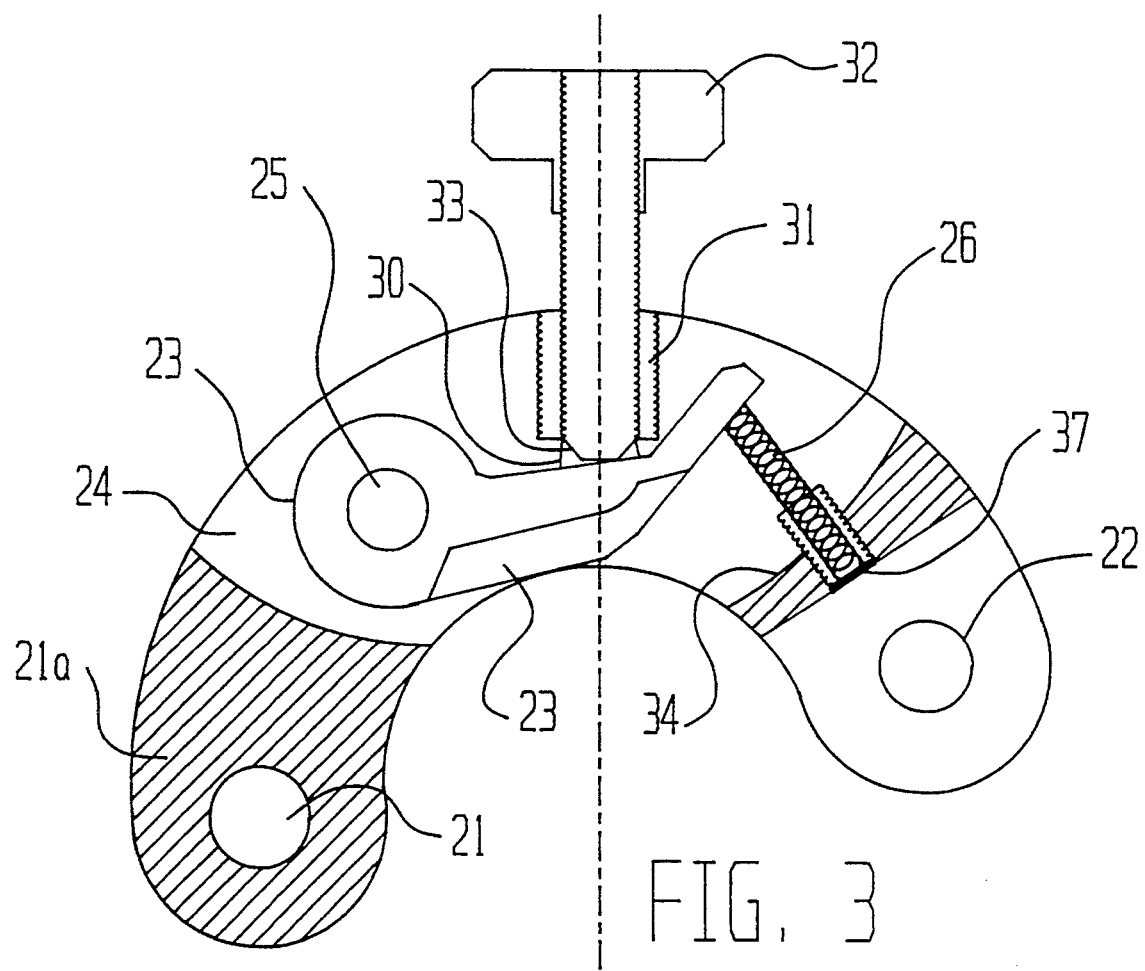
FIG. 3 is a sectional view of FIG. 2 with parts omitted for clarity of illustration, the section being taken generally on line 3—3 of FIG. 2.

As shown first in FIGS. 1-4 and 6, the tool of the present invention, generally indicated by the reference numeral 10, includes a housing 11 and a blade assembly 12, best shown in FIG. 3. The housing 11 is preferably cylindrically or doughnut shaped and formed of separate housing components 14 and 16 which define a passage 17. The housing components are preferably interconnected by means including a pivot pin 18 for pivotal movement about the axis of the pin between an open position, shown in FIG. 6, to a closed position, shown in FIG. 1. Gripping means which may include transversely extending grooves may be provided on the periphery of the housing components if desired.

In the closed position of the housing components, a bolt or other locking means 20 passes through aligned bores 21 and 22 in interleaved portions 21a and 22a to lock the housing components in the cylindrical configuration.

Preferably, bolt 20 is threaded or provided with another retaining means to ensure that it is retained in place when the components are locked together.

The blade assembly 12 used in carrying out the invention is best seen in FIG. 3. The blade assembly preferably includes blade 23 pivotally mounted within a relatively narrow recess or slot 24 which may be cut into housing component 14. A threaded pivot pin 25 preferably serves as a pivotal mounting means. Means including a compression spring 26 urge the blade 23 to a retractable position within recess 24. A set screw 28 having a threaded shank 29 is threaded into a bore 30 which is illustrated as being threaded into a threaded sleeve 31, which is in turn threaded into a bore within the housing component 14. The set screw 28 preferably has a knurled adjusting knob 32 and a tip 33 which is engageable with the back of blade 23. By advancement of the adjusting screw, pivotal movement of blade 23 about the axis of pin 25 is achieved, thereby moving the blade from the retractable position totally within the recess 24 to an extended position, best illustrated in FIG. 1. Surface 34 of recess 24 defines the lower limit of motion of the blade 23. It will be understood that rotation of the adjusting set screw 28 in the opposite direction allows for retraction of the blade assembly under the influence of compression spring 26. The extended position of the blade is the position of maximum cutting depth for a sheathed cable within the passage 17.

Figure 4:
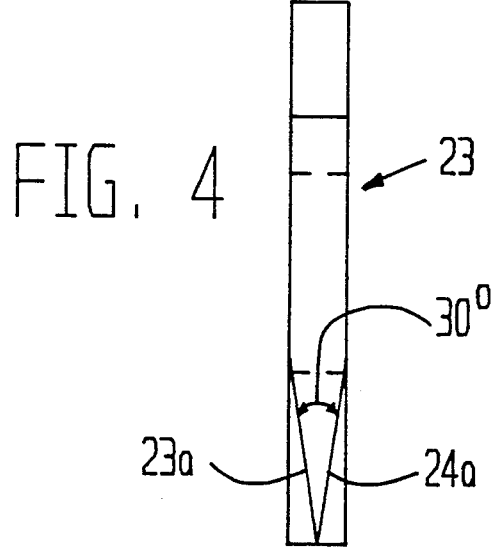
FIG. 4 is a profile view of a cutting blade of the type utilized in the device illustrated in FIG. 3.

A cross-sectional view of blade 23 may best be seen upon reference to FIG. 4. As shown in FIG. 4, the cutting edge of blade 23 is best formed by two bevelled surfaces 23a and 23b oriented with respect to one another by an included angle of approximately 30°. Preferably, blade pivot pin 25 is threaded and intended for easy removal by the provision of a hexagonally recessed head which is intended to receive a conventional allen wrench. The head configuration is best seen at 36 in FIG. 1. In like manner, spring 26 is seated within an externally threaded cupped-shaped sleeve 37 which is threaded into housing component 14, as shown in FIG. 3. Removal of blade assembly 12 may be readily removed by unthreading pin 25 and set screw 28 and the sleeve 31.

Figure 5:
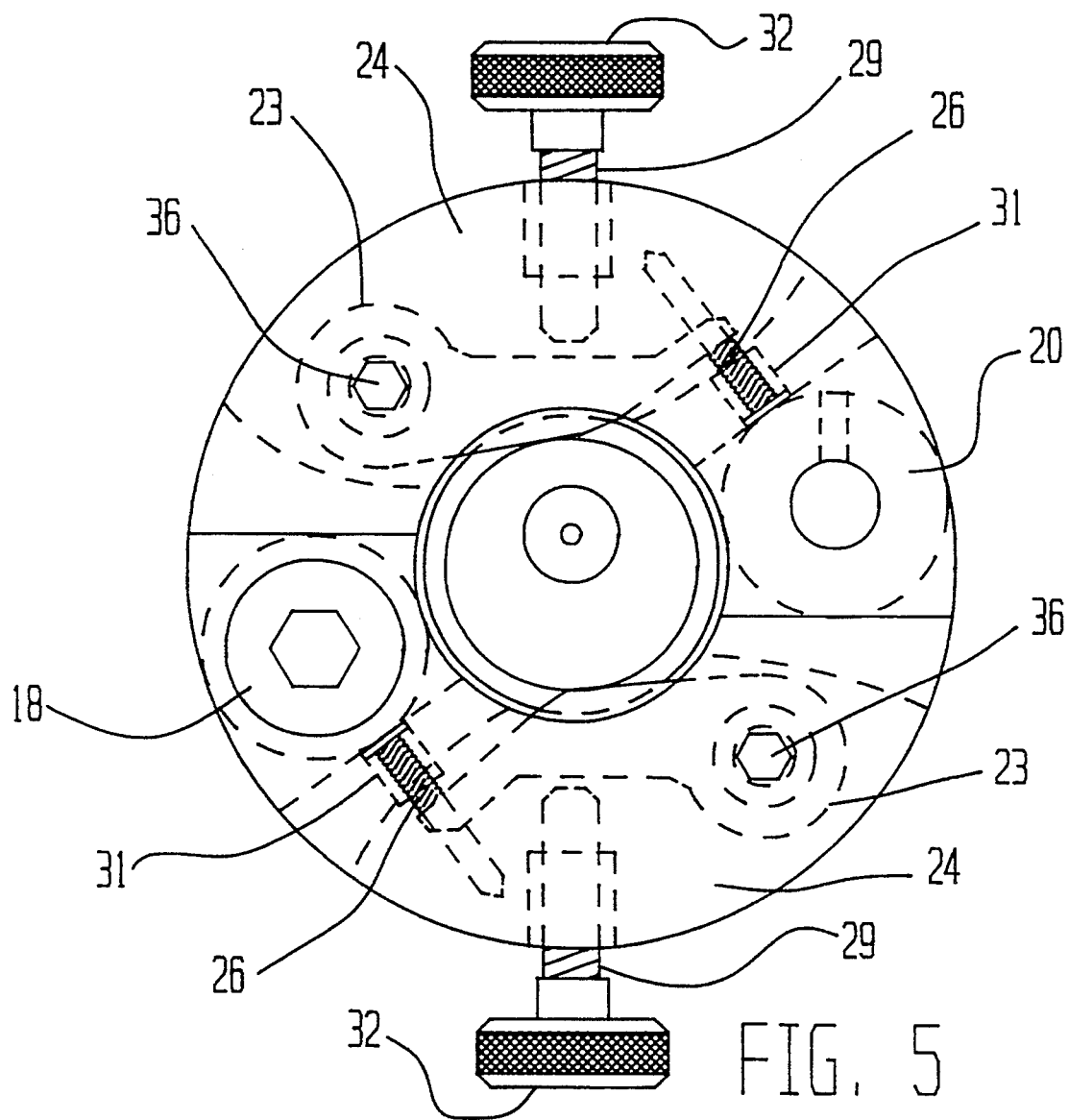
FIG. 5 is a plan view of an alternative form of the device of FIG. 1.
Figure 6:
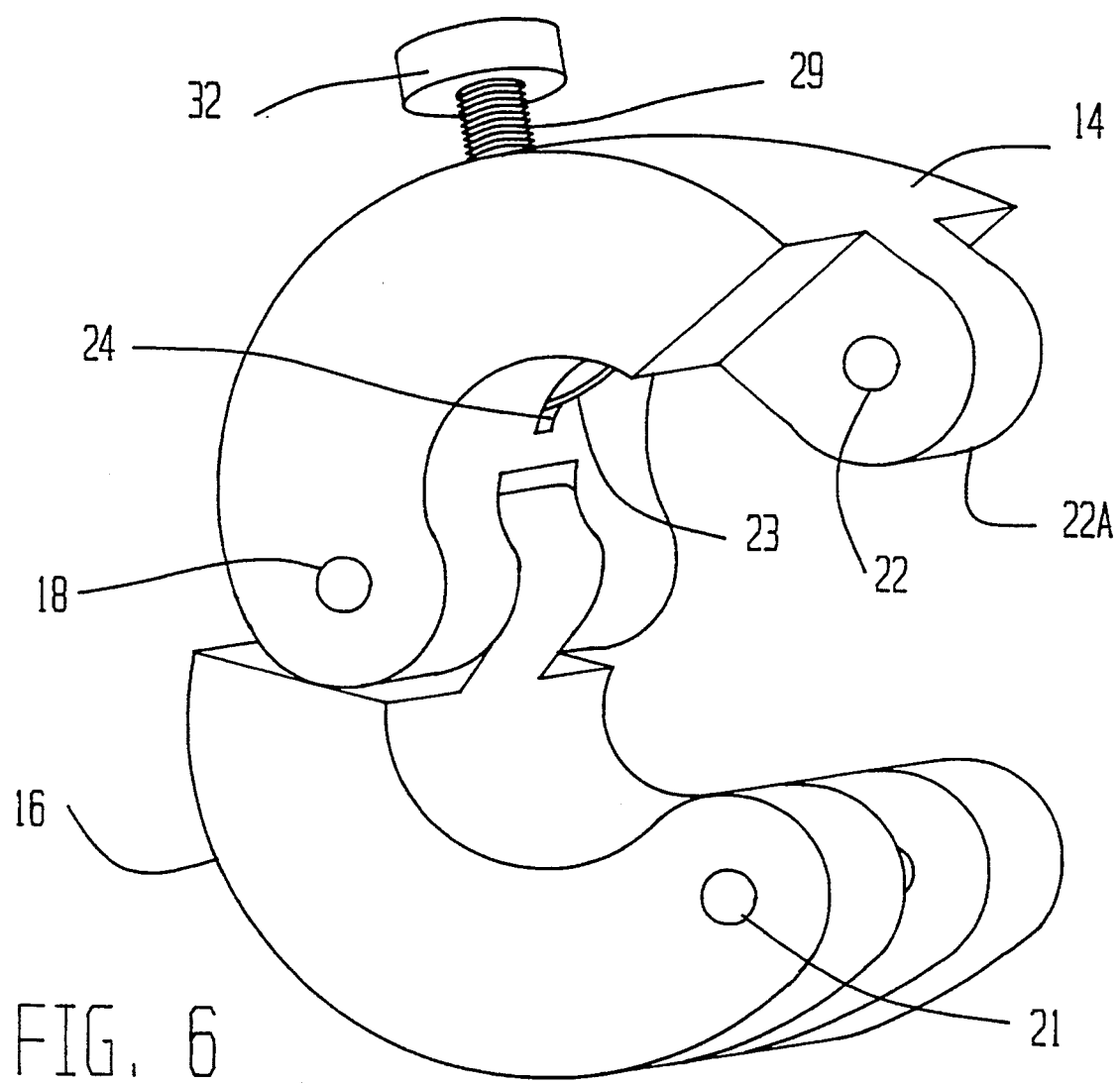
FIG. 6 is a perspective view of the device of FIGS. 1-3 illustrating the housing in the open position.

The embodiment of FIG. 5 is similar to the embodiment of FIGS. 1-4, with the exception that there are two separate blade assemblies mounted within oppositely disposed recesses in the two housing components 14 and 16. Each blade assembly of the embodiment of FIG. 5 is in substance identical to the assembly shown in FIGS. 1 and 3, and the same numbers are used to identify like parts of the two assemblies.

In operation of the tool 10, the technician first turns the blade set screw 28 in the counter clockwise direction until he visually determines that the blade is in the fully retracted position. The housing 11 is then fitted over the cable until the portion of the cable having a sheathing to be stripped is within passageway 17. The set screw 28 is then advanced by rotation in the clockwise direction until the blade 23 is at the desired cutting depth. If desired, suitable indicia or differently colored markings may be provided on the shank of the set screw in order to assist the operator in determining the appropriate blade setting. Once the technician is satisfied that the blade is correctly set, he grips the outer circumference of the body and rotates the tool 10 about the circumference of the cable to cut the sheath. If desired, the outer surface of the housing components may be knurled or provided with transversely extending grooves so that the operator can maintain a firm grip.

It is to be understood that the diameter of the passage 17 formed by the housing components 14 and 16 will be determined by the range of diameters of cables with which the invention is intended to be used. The range of depth settings for blade assembly 12 will be established by known variations in sheath thicknesses.

It can be seen that the device is extremely compact and can be fitted over cables to effect removal of sheathing in confined spaces where conventional knives and other sheath removing devices and cable cutters cannot be conventionally manipulated.

Although the invention is especially intended for use in the cutting and removal of sheathing from electric cables, it should be understood that it is applicable to the removal of protective rigid sleeving which does not have electrical components therein, such as rigid plastic conduit, pneumatic or hydraulic hoses or the like or axially movable control cables having a relatively impervious protective outer layer.

What is claimed:

1. An apparatus for cutting a cable sheath comprising:
    a housing defining a passage through which a cable having a sheath is placed;
    a first recess in said housing disposed transversely of said passage, said recess having a transversely extending elongated opening communicating with said passage;
    a first blade assembly including a blade having a cutting edge;
    means for movably mounting said blade within said first recess, said mounting means allowing movement of said blade from a first position in which the blade is retracted within said recess and a second position in which the cutting edge is within said passage; and
    means disposed adjacent to said opening for adjustably moving said blade through said opening and into said second position within said passage and means for returning said blade to said first position, wherein said means for adjustably moving said blade comprises a screw, a threaded opening dimensioned to receive said screw and extending through said housing into said recess, said screw being received within said opening and being rotatable in a first direction to push said blade to said second position.

2. The apparatus of claim 1, wherein said mounting means comprises a means for providing said blade.

3. The apparatus of claim 1, wherein means for adjustably moving said blade further comprises a manually actuatable knob attached to said screw.

4. The apparatus of claim 3, wherein the means for returning said blade comprises resilient means for resiliently urging said blade to said first position.

5. An apparatus for cutting a cable sheath comprising:
    a housing defining a passage through which a cable having a sheath is placed;
    a first recess in said housing disposed transversely of said passage, said recess having a transversely extending elongated opening communicating with said passage;
    a first blade assembly including a blade having a cutting edge;
    means for movably mounting said blade within said first recess, said mounting means allowing movement of said blade from a first position in which the blade is retracted within said recess and a second position in which the cutting edge is within said passage; and
    means disposed adjacent to said opening for adjustably moving said blade through said opening and into said second position within said passage and means for returning said blade to said first position, said housing comprising first and second complementary housing components, said housing components having interengagable end portions, hinge means at one end portion of each housing component for hingedly securing said components together, said housing components being relatively moveable between a closed position in which said housing components are engaged at the opposite end portion thereof and define said passage.

6. Apparatus according to claim 5, wherein said housing is of a substantially cylindrical cross section.

7. Apparatus according to claim 6, further including a locking means for locking the opposite end portions of said housing components.

8. Apparatus according to claim 7, wherein said first recess is in said first housing component, a second recess in said second housing component, said second recess being disposed oppositely to said first recess and having a transversely extending elongated opening communicating with said passage and a second blade assembly substantially identical to the first blade assembly, there being means for pivotally mounting the blade of said second assembly within said second recess for movement from a first position in which the blade of the second blade assembly is retracted within said second recess and a second position in which the cutting edge of the second blade assembly is within said passage and second means for returning the blade of said second blade assembly to said first position.

9. The apparatus of claim 8, wherein said means for adjustably moving said blade comprises a screw, a threaded opening dimensioned to receive said screw and extending through said housing into said recess, said screw being received within said opening and being rotatable in a first direction to push said blade to said second position.

* * * * *